United States Patent Office

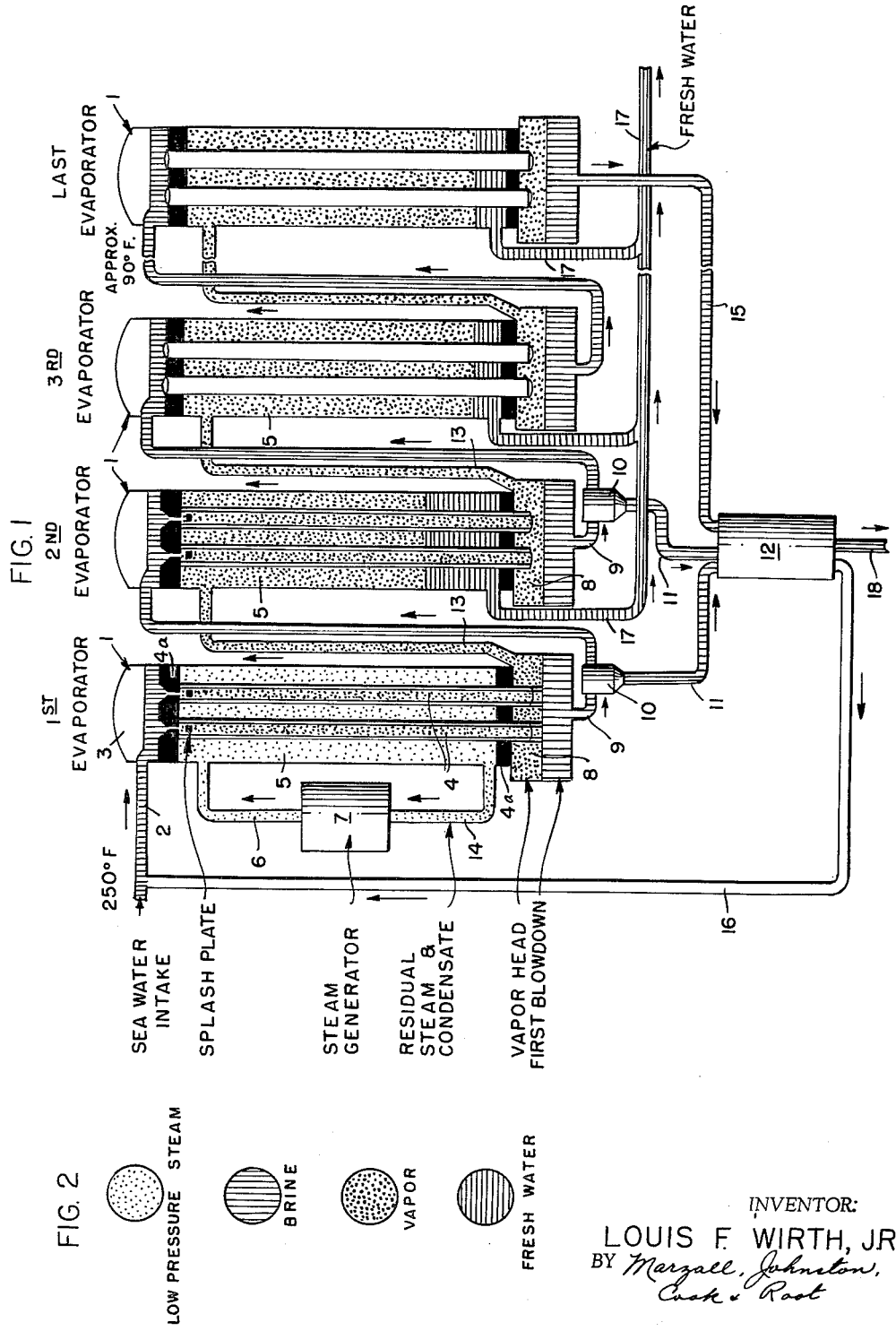

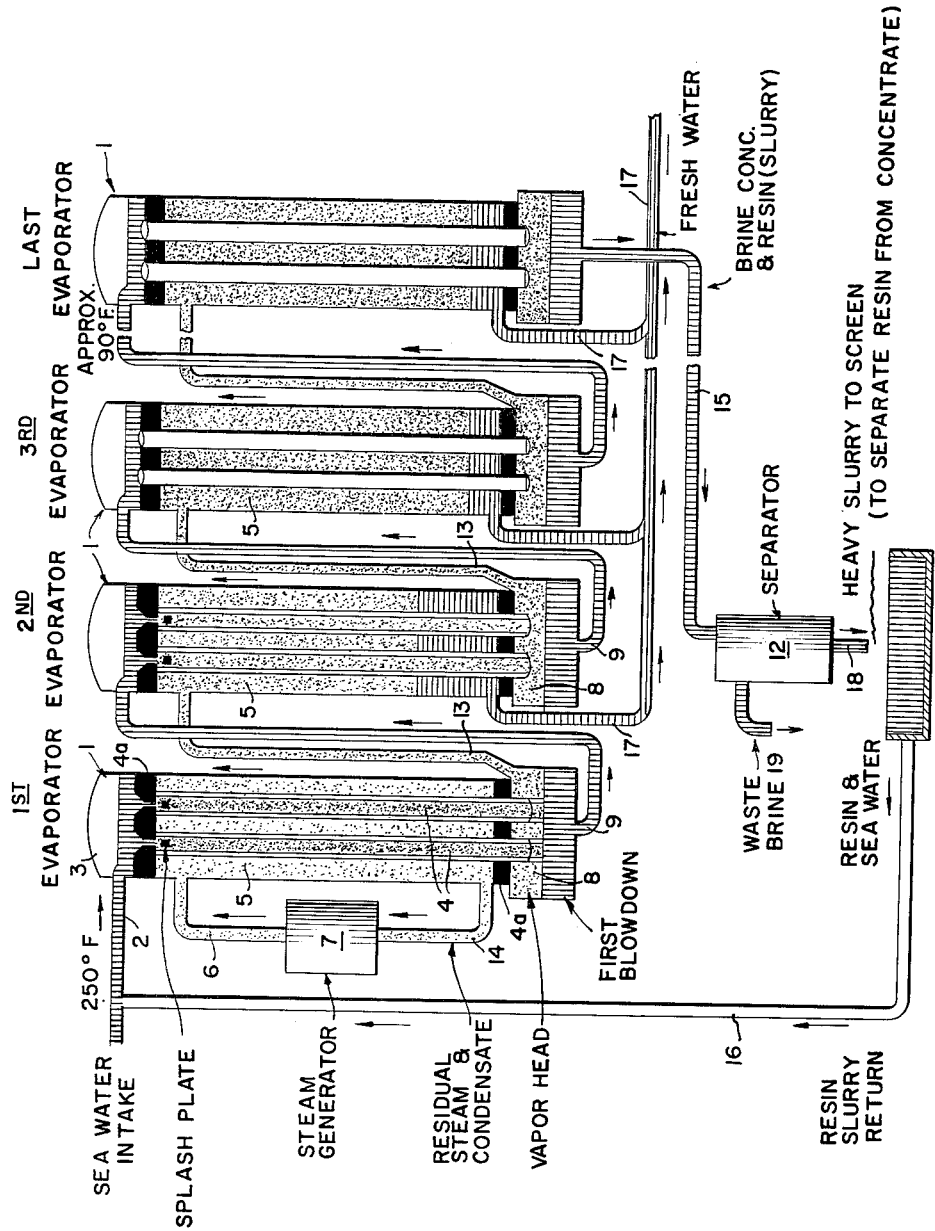

3,203,873
Patented Aug. 31, 1965

3,203,873
PROCESS FOR SCALE PREVENTION IN SALINE WATER EVAPORATOR
Louis F. Wirth, Jr., Western Springs, Ill., assignor to Nalco Chemical Company, Chicago, Ill., a corporation of Delaware
Filed Mar. 15, 1962, Ser. No. 179,922
5 Claims. (Cl. 202—45)

The subject invention relates to an improvement in certain known distillation processes. More particularly, the present invention is directed to the control of scale formation in evaporators and heat-exchangers which are used in processing sea water and the like into fresh water.

An acute shortage of fresh water exists in certain areas of the world. For this reason considerable effort is being expended to find a suitable means for converting saline waters such as sea water into water which is suitable for agricultural, industrial, municipal, etc., uses. In this regard, a number of physical and chemical processes have been developed which are capable of demineralizing saline waters. The most widely practiced methods of treating sea water, brackish water, etc., make use of one or more heat-exchangers. Such heat-exchangers include flash evaporators, submerged tube evaporators, vapor compression evaporators, long-tube vertical (LTV) evaporators, wiped film evaporators, etc.

Although installed plants have been producing millions of gallons of fresh water per day from sea water for several years, the cost of such operations often has been prohibitive for general purposes. Due to recent research and development efforts, the cost of producing fresh water from sea water has been lowered from about $4.00 per thousand gallons to about $2.00 per thousand gallons. Despite this fact, the cost of producing fresh water by distillation means remains of paramount importance.

One area that is being investigated in an effort to reduce expenditures is that of scale control. Due to the presence of calcium and magnesium ions in sea water, calcium sulfate, aragonite ($CaO_3$) and other materials precipitate out of solution and build up on the surfaces of heat-exchange equipment. If the scale is not removed the production of water gradually diminishes until the equipment becomes inoperable. When this happens it is necessary to carry out a costly shut down of the plant and to free the heat-exchange surfaces of scale. Shut downs of this type require that the brine be removed from the equipment and be replaced by fresh water in order to control corrosion. Several hours of plant operation are required merely to replace the sea water with fresh water in certain large scale units.

The control of scale formation by the use of pH has been practiced for over thirty years. Adding acid to the feed water and then stripping the water of carbon dioxide removes bicarbonate and bicarbonate ions substantially eliminating carbonate scale. By adding caustic soda to a pH of 8 it is also possible to control the solubility of magnesium hydroxide.

Calcium sulfate is one of the most difficult scale forming ingredients of sea water to control. As the temperature of the water increases, calcium sulfate becomes less soluble. Adjusting the pH of the water does not prevent the precipitation of calcium sulfate. It has been proposed to use a slurry of the anhydrite of calcium sulfate to prevent scale formation. One disadvantage of this technique lies in the fact that the sulfate crystal must be of the type that inhibits scale formation. Success depends upon the growth of calcium sulfate "seeds" which act as a nucleus for precipitation of calcium sulfate from solution.

In another method of controlling scale formation that has been tested in recent years, ion-exchange materials are used to soften the water. Such materials reduce or eliminate calcium and magnesium ions from the solution and replace them with sodium ions. The cost of carrying out an ion-exchange treatment of sea water is a drawback of this system. In existing operations, the ion-exchange takes place in separate treating equipment. Such equipment includes resin columns, regeneration means, etc.

The principal object of the present invention is to provide an improved method of controlling scale formation in heat evaporators.

A further object of the invention is to provide an improved process for controlling scale formation in heat evaporators through the use of ion-exchange materials.

Another object of the invention is to provide a supplement to pH scale control methods which can be practiced economically and effectively.

Still another object of the invention is to provide a process for controlling scale formation which can be used in connection with the evaporation of sea water, brackish water, sugar juice, and other liquids by heat-exchange methods.

Other objects will become apparent to those skilled in the art from the following detailed description of the invention.

In general, the present invention comprises the discovery of an improved process for preventing scale formation in heat-exchange equipment. The subject process is designed for use in conjunction with existing distillation units as well as distillation units that may be specifically designed to accommodate this method of scale control. In the process, resinous or other ion-exchange material is fed into a line carrying sea water, brackish water, and the like, to an evaporator. The influent may first have been acid treated and de-aerated. The ion-exchange material performs its function within the evaporator causing the removal of calcium and magnesium ions from the liquid. Where cationic and anionic resins regenerated to the hydrogen and free-base forms are used, demineralization can be accomplished. In one embodiment of the invention, properly regenerated cation and/or anion resins can be used for pH control during the evaporation process without the addition of acid of alkali. In a still further embodiment, the ion-exchange resins are used as catalysts where a catalyst is required during concentration by evaporation, etc.

In the subject process the regeneration of the resins can be accomplished either within the heat-exchange equipment or in a separate zone. In the latter technique, resin, which has been fed into the evaporator with the sea water or other influent, is circulated within the heat-exchanger and is then separated from the concentrate as it leaves the evaporator by the use of a hydraulic cyclone or the like. The resin is then regenerated either batchwise or by a continuous operation. The brine from the last evaporator in the distillation unit can be used as the regenerating material when sea water or brackish water is being evaporated.

Where a multiple effect evaporator system is used and where a liquid feed such as sea water is passed to the first evaportor at a high temperature, it is possible to carry out the regeneration of the resin material within the system itself. In this modification of the basic process, scaling is controlled at high temperatures due to the sorption of calcium and magnesium ions by the exchange resin. As the brine and resin progress through subsequent evaporators, however, the equilibrium between the resin and the brine shifts as the concentration of brine in the evaporators is increased. In the last evaporator the resin will be substantially regenerated. Scaling does not occur in the last few evaporators because of the lower temperature. As was pointed out above, calcium sulfate becomes more soluble as the temperature of the liquid is decreased. The steps of this embodiment of the invention are as follows:

(1) Cation ion-exchange resin or other ion-exchange material in the sodium form is fed to the first evaporator. Equilibrium is reached for the temperature-brine or other liquid concentration in that evaporator.

(2) The resin and liquid are transferred to the next stage where equilibrium reverses slightly as the solution becomes more concentrated.

(3) This sequence is repeated until the final stage of concentration is reached. At this point, the substituents of the concentrate are similar to those of the original feed.

(4) The ion-exchange material is collected in a suitable vessel for separation from the concentrate by settling or other means. The settled resin is removed and further separated from the concentrate by draining or vacuum filtration and returned to the influent stream of the primary stage without rinsing or washing. If washing or rinsing is desired or necessary this may be done with the influent stream or with water to cleanse and displace the concentrate before feeding back to the primary stage. Occasional supplemental regenerant may be used to replace losses that occur in washing, rinsing, etc.

At the final stage of the process the resin has a smaller pore size due to the fact that less water is present. The brine, which is strongest at this stage, shrinks the resin. If the strong brine is removed from the voids and surface of the resin beads by draining or vacuum filtration, the amount of salts left in the pores is considerably less than that which would be present after dilution by rinsing and swelling with water. This fact makes the draining and vacuum filtration of the resins of importance, especially with sea water evaporation.

The invention can be understood more clearly by reference to the attached drawing in which:

FIGURE 1 is a schematic representation of a long-tube vertical distillation process incorporating the subject invention;

FIGURE 2 is an explanatory view setting forth the graphic symbols used in FIG. 1; and FIGURE 3 is a schematic representation of a second embodiment of the subject invention.

As is shown in FIG. 1, ion-exchange material is passed into a first effect or evaporator 1 along with influent such as sea water through inlet pipe 2. The sea water and ion-exchange material passes to distributor chamber 3 and downwardly through tubes 4. On tubes 4 a portion of the sea water is vaporized. Chamber 5 surrounding tubes 4 is heated by means of steam passing through line 6 from steam generator 7. The steam fills the space around and outside of tubes 4 which causes a portion of the sea water to boil as it falls through the tubes. A mixture of vapor and hot brine emerges from lower region 8 of evaporator 1. The hot brine and ion-exchange material is pumped through line 9 to separator 10. The ion-exchange material is removed from the brine in the separator. Where resinous material is being used, the separator preferably is a cyclone type separator. The hot brine flows from separator 10 to the distributor chamber of the second evaporator where the brine again falls through tubes 4. The ion-exchange resin is passed through line 11 to column 12 where it is regenerated. Vapor that is produced in evaporator 1 flows through line 13 to chamber 5 of the second evaporator. Residual steam and condensate are returned to generator 7 through line 14. In the second evaporator the vapor is condensed to fresh water by giving up its latent heat of vaporization to the sea water which is falling through tubes 4. The heat given up by the vapor again causes a portion of the sea water to boil. After flowing through tubes 4 of the second evaporator and into lower region 8 of the second evaporator, any ion-exchange material remaining in the system is separated from the brine by means of a second separator 10. Resin from evaporator 2 as well as evaporator 1 is passed through line 11 to column 12 where it is regenerated with brine which flows from the last evaporator to the column through line 15. Any resin particles escaping the separators will be returned to the system with this brine. The regenerated resin is then recycled to intake pipe 2 through line 16. Fresh water that is built up in chambers 5 is removed through lines 17 to a suitable storage tank. Brine that has been used to regenerate the ion-exchange material in column 12 can be discarded through line 18.

The evaporator can be operated at any temperature which will permit evaporation at the pressure existing in the evaporator tubes. In multiple effect systems the temperature may range from about 200°–300° F. The water is gradually cooled as it passes through the evaporator till the temperature is from about 90° to 120° F. in the last effect (as many as twelve effects). The resin absorbs calcium and magnesium ions from the sea water which prevents the formation of calcium sulfate scales as well as other insoluble materials.

In the second embodiment of the invention as shown in FIG. 3, the ion-exchange material is not separated from the brine but, rather, passes through the entire system. As was pointed out above, calcium sulfate becomes more soluble as the temperature of the liquid decreases. In the first evaporator, scaling is prevented by the absorption of the calcium and magnesium ions by the exchange material. As the temperature decreases in subsequent evaporators, the equilibrium of the system changes so that in the last evaporator the ion-exchange material is regenerated. This material can then be recycled to inlet pipe 2. In this embodiment, it is not necessary to use separators or regeneration columns. The unit shown in FIG. 3 differs from that of FIG. 1 in that separator 10 and line 11 of the first two evaporators have been eliminated and line 9 provides direct flow of the brine-resin slurry between evaporators. Additionally, line 15 contains the final concentrated brine and the regenerated resin which goes to separator column 12. As the brine-resin slurry enters the separator the resin settles to the bottom of the column and the waste brine overflows at line 19. Line 18 contains the regenerated resin, with a small amount of brine occupying the voids between the resin particles. Line 18 goes to a screen which filters out the resin particles. The regenerated resin is then diluted with sufficient sea water to facilitate pumping, and the sea water-resin slurry is returned via line 16 to the sea water intake.

The following examples serve to illustrate the subject invention.

EXAMPLE I

This example shows the hardness-sodium equilibrium between sea water (normal and concentrated) and Nalcite HGR-W under conditions similar to those existing in a multiple effect evaporator. The sea water used was a synthetic solution with the following composition:

| | P.p.m. | Eq./liter |
|---|---|---|
| Sodium (Na) | 10,635 | .465 |
| Magnesium (Mg) | 1,067 | .089 |
| Calcium (Ca) | 420 | .021 |
| Chloride (Cl) | 18,708 | .527 |
| Sulfate (SO$_4$) | 2,304 | .048 |

Nalcite HGR-W is an ion-exchange resin of the sulfonated crosslinked polystyrene type. The properties are as follows:

Sodium form:
  Total capacity, meq./dry gram _____ 4.50
  Total capacity, meq./ml. _____ 2.22
  Water holding capacity, percent _____ 42.3
  Wet screen analysis
    (U.S. standard screens)
      percent, +20 _____ 21.6
      percent, +30 _____ 52.2
      percent, +35 _____ 18.6
      percent, +40 _____ 4.6
      percent, +50 _____ 2.4
      percent, +100 _____ .6

A 10 ml. quantity of Nalcite HGR-W, sodium form, was added to 200 ml. of the synthetic sea water in a rotating flask evaporator. Concentration was started at 212° F. The pressure was gradually reduced so that at a concentration factor of 2.9 the temperature was 130° F. The resin was removed from the concentrate, added to another 200 ml. aliquot of synthetic sea water, and the mixture concentrated as before. This procedure was repeated until analysis of the solutions indicated that equilibrium conditions had been reached. After six cycles the solution and resin were analysed. The data are shown in Table 1.

Table 1

HARDNESS—SODIUM EXCHANGE BETWEEN NALCITE HGR-W AND SEA WATER (NORMAL AND CONCENTRATED)

| Sea water | Normal | | Concentrated 2.9× | |
|---|---|---|---|---|
| Phase | Solution | Resin | Solution | Resin |
| Volume, ml | 200 | 10 | 70 | 10 |
| Calcium, meq | 3.2 | 3.8 | 4.2 | 2.8 |
| Magnesium, meq | 15.0 | 7.6 | 17.5 | 5.1 |
| Sodium, meq | 96.5 | 10.8 | 93.0 | 14.3 |

The data indicate that under the conditions of the test the exchange in meq./ml. of resin is: Calcium 0.1, magnesium 0.25, sodium 0.35. This is equivalent to 1.09 lbs. of total hardness as $CaCO_3$ per cubic foot of resin, 0.124 lb. Ca/cu. ft. and 0.191 lb. Mg/cu. ft.

Table 2 is an analysis of the sea water in the various phases of the cycle.

Table 2

COMPARISON OF CATION CONTENT OF SEA WATER DURING EVAPORATION CYCLE

| | Calcium, p.p.m. | Magnesium, p.p.m. | Sodium, p.p.m. |
|---|---|---|---|
| Synthetic sea water feed | 420 | 1,067 | 10,635 |
| Sea water plus resin | 320 | 915 | 11,100 |
| Concentrated sea water, 2.9× | 1,200 | 3,050 | 30,400 |

EXAMPLE II

In this example, the resin and sea water are fed into the first effect evaporator. In going from the first to the second effect, however, the resin is filtered from the sea water. The concentrated sea water leaving the final effect is passed through the resin to regenerate it.

The Nalcite HGR-W and synthetic sea water were the same as those used in Example I. A 10 ml. quantity of Nalcite HGR-W was added to 200 ml. of synthetic sea water in a rotating flask evaporator. The mixture was heated at 212° F. for a short period and the resin removed by filtration. The evaporation of the sea water was continued while pressure and temperature were slowly reduced until a concentration factor of 2.9 was reached. The concentrated sea water was passed through the bed of resin after which the resin was added to another 200 ml. aliquot of synthetic sea water. The procedure was repeated and the resin and solutions analysed. The data are presented in Table 3.

Table 3

HARDNESS—SODIUM EXCHANGE ON NALCITE HGR-W

| | Calcium, meq. | Magnesium, meq. | Sodium, meq. |
|---|---|---|---|
| Resin Exhausted (after contact with sea water) | 3.8 | 7.6 | 10.8 |
| Resin Regenerated (after contact with concentrated sea water) | 2.7 | 4.7 | 14.8 |
| Available exchange/10 ml | 1.1 | 2.9 | 4.0 |
| Available exchange/ml | .11 | .29 | .4 |

The ion-exchange material that is used in the subject process can be selected in accordance with the effect that is desired. Where cationic and anionic resins regenerated to the hydrogen and free base forms are used, demineralization can be accomplished. If it is desired merely to control calcium sulfate deposits and the like, a cation exchanger in the sodium form can be used to good advantage.

Ion-exchange resins are generally divided into four categories. These categories are strong acid resins, strong base resins, weak base resins, and weak acid resins. Strong acid resins include those products sold under the trademarks Nalcite HCR and Dowex 50. These resins are made by the nuclear sulfonation of styrene-divinyl benzene beads as is described in U.S. Patent 2,366,007. Among the strong base resins which can be used in the process are the commercially available products Nalcite SBR, Dowex 1, Dowex 2, Dowex 11, etc. Nalcite SBR and Dowex 1 and 2 are described in U.S. Patent 2,591,573. Each of these resins has a quaternary ammonium type of exchange group. Typical weak base anion exchange resins that can be used in the process are are Nalcite WBR and Amberlite IR–4B. The latter is a modified phenol-formaldehyde polyamine condensate containing 14% nitrogen and 39.9% water in the basic form of the resin and having an exchange capacity of 10 milli-equivalents per gram of resin. The properties of the resin are described by Kunin and Meyers in the Journal of the American Chemical Society, vol. 69, page 2874 (1947). Other anion exchangers are described in U.S. Patent 2,422,054 and 2,438,230. As has been indicated previously, the ion-exchange resin Nalcite HGR-W can also be used in the process.

In addition to solid ion-exchangers, liquid exchangers, both cationic and anionic, can be used in this process. A typical liquid anion exchanger that can be used in this process is Aliquot 336. This material is a liquid, water-insoluble quaternary amine manufactured by General Mills Corporation. Liquid cation exchangers such as monoalkyl acid and dialkyl acid phosphate esters can be used. Liquid exchangers are generally carried in organic materials such as kerosene and carbon tetrachloride. High boiling solvents would be desirable for high temperature operation.

In addition to resinous exchangers and liquid exchangers, inorganic ion-exchanger materials can be used in this process. Typical inorganic ion-exchangers are zeolites, sodium alumino silicates and inorganic microcrystalline aggregates. A typical inorganic microcrystalline aggregate is zirconium molybdate ion-exchange crystals processed by Bio-Rad Laboratories.

The mesh size of the ion-exchange materials can vary widely. A mesh size (U.S. standard screens) of from 20 to 50, for example, will work satisfactorily in most instances. In certain applications of the process, it will be of advantage to use finer particles.

Obviously many modifications and variations of the invention as hereinbefore set forth may be made without departing from the spirit and scope thereof, and therefore only such limitations should be imposed as are indicated in the appended claims.

I claim:

1. A continuous process for preventing the deposit of scale on the surfaces of the heat-exchangers of a multiple effect distillation unit which comprises: passing a cation-exchange material into the first effect of said distillation unit along with a saline water influent which in addition to sodium ions contains ions selected from the group consisting of calcium and magnesium ions; continuously removing said cation-exchange material and the nonvaporized fraction of said influent from said effect; separating said cation-exchange material from said nonvaporized fraction; passing said nonvaporized fraction to the second and subsequent effects of said distillation unit; contacting said cation-exchange material with the nonvaporized fraction leaving the last effect of said distillation unit, whereby said cation-exchange material is regenerated; and returning said cation-exchange material to the first effect of said distillation unit along with additional influent.

2. A continuous process for preventing the deposit of scale on the surfaces of the heat-exchangers of a multiple effect distillation unit which comprises: passing a cation-exchange material into the first effect of said distillation unit along with a saline water influent which in addition to sodium ions contains ions selected from the group consisting of calcium and magnesium ions, continuously passing said cation-exchange material along with the nonvaporized fraction of the influent to the second and subsequent effects of said distillation unit while withdrawing the vaporized and condensed fraction of the influent from said unit, the equilibrium conditions changing as said cation-exchange material and said nonvaporized fraction are moved from effect to effect, the temperature of said influent being gradually lowered as said influent is passed from effect to effect; separating the cation-exchange material from the nonvaporized fraction of the influent as it leaves the last effect of said unit, said cation-exchange material being substantially regenerated as it leaves said last effect due to said shift in equilibrium; and returning said cation-exchange material to the first effect of said distillation unit along with additional influent.

3. A process as in claim 2 wherein said influent is sea water and wherein said cation-exchange material is a strongly acidic cation-exchanger resin.

4. A continuous process for preventing the deposit of scale on the surface of the heat-exchangers of a multiple effect distillation unit which comprises: passing cation exchange material into the first effect of said distillation unit along with a saline water influent which in addition to sodium ions contains ions selected from the group consisting of calcium and magnesium ions; a portion of said saline water being evaporated in said effect leaving nonvaporized brine, said cation exchange material serving to remove calcium and magnesium ions from said water; continuously removing a mixture of said cation exchange material and the nonvaporized brine from said first effect; passing said nonvaporized brine to the subsequent effects of said distillation unit, said brine acquiring a higher and higher concentration of sodium ions as it moves from effect to effect; separating said cation exchange material from said nonvaporized brine after said mixture has passed through at least one effect of said unit; thereafter contacting said separated cation exchange material with highly concentrated brine from said unit, whereby said cation exchange material is regenerated; and thereafter returning said cation exchange material to the first effect of said distillation unit along with additional influent.

5. A continuous process for preventing the deposit of scale on the surface of the heat-exchangers of a multiple effect distillation unit which comprises: passing cation exchange material into the first effect of said distillation unit along with an aqueous influent which in addition to sodium ions contains ions selected from the group consisting of calcium and magnesium ions; a portion of said aqueous influent being evaporated in said effect leaving a nonvaporized fraction, said cation exchange material serving to remove calcium and magnesium ions from said aqueous influent; continuously removing a mixture of said cation exchange material and the nonvaporized fraction from said first effect; passing said nonvaporized fraction to the subsequent effects of said distillation unit, said nonvaporized fraction acquiring a higher and higher concentration of sodium ions as it moves from effect to effect; separating said cation exchange material from said nonvaporized fraction after said mixture has passed through at least one effect of said unit; thereafter regenerating said cation exchange material and returning said cation exchange material to the first effect of said distillation unit along with additional influent.

References Cited by the Examiner

UNITED STATES PATENTS

| | | | |
|---|---|---|---|
| 2,127,450 | 8/38 | Schneider et al. | 210—48 |
| 2,979,442 | 4/61 | Badger. | |
| 3,000,795 | 9/61 | Goeldner. | |
| 3,021,265 | 2/62 | Sadtler | 202—174 |
| 3,026,261 | 3/62 | Mayfield et al. | 210—46 |
| 3,056,651 | 10/62 | McIlhenny et al. | |

OTHER REFERENCES

"Symposium on Saline Water Conversion," Office of Saline Water, U.S. Dept. of the Interior, Publication 568, National Academy of Sciences-National Research Council, Washington, D.C., 1958, pp. 47–48.

NORMAN YUDKOFF, *Primary Examiner.*

GEORGE D. MITCHELL, *Examiner.*